A. C. MATHER.
CLUTCH.
APPLICATION FILED MAR. 1, 1907.
932,155.
Patented Aug. 24, 1909.
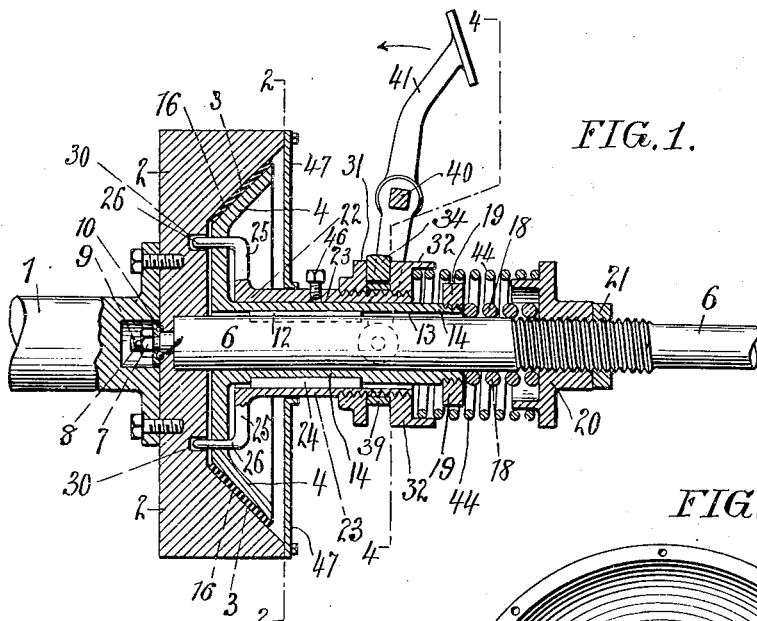
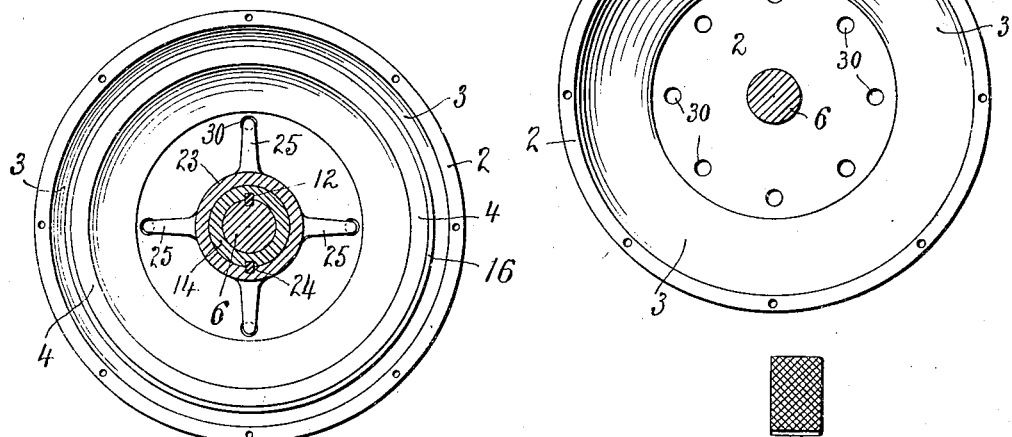
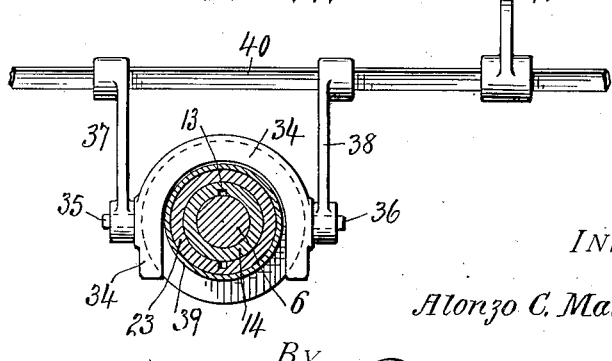
INVENTOR
Alonzo C. Mather
By F. DeWitt Goodwin
Attorney
WITNESSES:
M. R. Cleland
Hugh Mahany, Jr.

UNITED STATES PATENT OFFICE.

ALONZO C. MATHER, OF CHICAGO, ILLINOIS.

CLUTCH.

932,155.

Specification of Letters Patent.

Patented Aug. 24, 1909.

Application filed March 1, 1907. Serial No. 360,028.

*To all whom it may concern:*

Be it known that I, ALONZO C. MATHER, a citizen of the United States, residing at Chicago, in the county of Cook and State of Illinois, have invented certain new and useful Improvements in Clutches, of which the following is a specification.

My invention relates to improvements in a clutch and has for its object the construction of a clutch in which the driving-shaft may be coupled with the driven - shaft by means of friction and in addition to the frictional contact to provide means for locking the members rigidly together.

A further object of my invention is to so construct the clutch that the locking mechanism may be withdrawn from action without releasing the frictional contact between the members.

A still further object of my invention is to provide means for operating the clutch so that the frictional contact may be applied so as to permit the members to slip, which in some cases is desirable, as for example: when the clutch is used on automobiles it is an advantage when climbing a hill to allow the clutch to slip.

Referring to the drawings: Figure 1. is a vertical sectional view of a clutch embodying my invention; Fig. 2. is a sectional view on line 2—2 Fig. 1; Fig. 3. is a view similar to Fig. 2. with the clutch member removed; Fig. 4. is a cross-section on line 4—4 Fig. 1.

In the drawing 1 is a driving-shaft securely bolted to a disk 2 which may be made heavy to act as a fly-wheel. The said disk has a conical recess formed in its face to form a surface 3 against which acts the clutch member 4. A shaft 6 is revolubly mounted, at one end, in a central aperture formed in the disk and is held in position by a nut 7 and pin 8 on the reduced end portion 9 of the shaft 6. Ball bearings 10 are provided to relieve the friction caused by end thrusts of the shaft.

The clutch member 4 is slidably mounted upon the shaft 6 and is prevented from turning upon said shaft by means of a key 12 which is secured in a recess in said shaft and in an elongated slot 13 formed in the inside of the sleeve 14 of the clutch member 4.

The clutch member 4 has a conical flange conforming to the shape of the recess formed in the face of the disk. Said clutch member is provided with a leather face or bushing 16 which contacts with the conical surface of the disk 2.

A heavy spring 18 is provided to increase the amount of friction between the disk 2 and the clutch member 4. Said spring 18 acts between a collar 19 screwed on the end of the sleeve 14 of the clutch member and a nut 20 on the shaft 6. The nut 20 is screwed upon the shaft so that its position can be adjusted to vary the pressure of the spring against the clutch member. A lock-nut 21 is provided to prevent the nut 20 from accidentally turning.

A locking member 22 is provided, having a sleeve 23 slidably mounted on the sleeve 14 of the clutch member. A key 24 secured in a recess in the sleeve 14 of the clutch member 4 and working in a slot formed in the sleeve 23 of the locking member 22 prevents the latter from turning and permits it to slide longitudinally upon the sleeve 14 of the clutch member. The said locking member consists of the said sleeve 23, above described, having radial arms 25 carrying projections 26, extending at right angles to said arms. The said projections 26 project through apertures formed in the clutch member 4 and are adapted to enter apertures 30 formed for that purpose in the disk, as shown in Fig. 3. The sleeve 23 is also provided with collars 31 and 32 which are secured upon said sleeve. The said collars 31 and 32 form flanges between which is placed a yoke 34 having stud-shafts 35 and 36 mounted in arms 37 and 38 depending from the square shaft 40. Upon the shaft 40 is a pedal 41 for operating the same. Between the collars 31 and 32 is placed a sleeve 39 to prevent the said collars from binding the yoke 34 and also preventing the yoke from resting upon the threaded portion of the sleeve 23.

A spring 44 is placed between the collar 32 on the locking member and the nut 20 on the shaft 6 and is adapted to force the locking member into engagement with the disk 2.

A set-screw 46 or any other suitable device may be used to permanently hold the locking member out of action.

The operation of my invention is as follows: When the pedal 41 is in the position shown in Fig. 1 the spring 18 forces the clutch member 4 against the disk 2 and the spring 44 forces the projections 26 of the locking member into engagement with the disk. The parts being thus positively locked together the motion of the disk will be communicated to the shaft 6, as the locking member and the clutch member are each keyed to prevent them turning without turning the said shaft. By moving the pedal in the direction of the arrow Fig. 1. the locking member 22 will be acted upon by the yoke 34 which will slide the said locking member upon the sleeve 14 of the clutch member, against the action of the spring 44, and the projections 26 of the locking member will be withdrawn from engagement with the disk. The clutch member will remain in contact with the disk, by the action of the spring 18, until the pedal is still further advanced, when so advanced the collar 32 on the sleeve of the locking member will contact with the collar 19 on the sleeve 14 of the clutch member, which will cause the latter to slide upon the shaft 6 against the action of the spring 18 and relieve the pressure between the clutch member and the disk and allow the clutch member to slip. By advancing the pedal still farther the clutch member will be withdrawn entirely from the action of the disk and allow the latter to revolve without turning the clutch member and the shaft 6. When the pedal is brought back to its original position, (Fig. 1.) the clutch member will be released first and the heavier spring 18 will quickly force it against the disk causing the parts to rotate together. The locking member will then be released and the lighter spring 44 will slide the locking member upon the sleeve 14, of the clutch member and force the projections 26 against the surface of the disk and cause them to drop into the apertures in the disk when the latter turns sufficiently, in relation to the clutch member, to bring the said apertures in alinement with the projections and thus securely lock the parts together.

If it is desired to use the clutch with the clutch member only, the locking member may be withdrawn out of action and secured by the set screw 46 to the sleeve 14 of the clutch member, the latter may then be operated by the pedal without the projections of the clutch member entering into the apertures formed in the disk. Any suitable means may be used to hold the locking member out of action without departing from my invention.

A plate 47 is bolted to the inner face of the disk 2 to prevent dust from entering the interior of the clutch, a central aperture being formed in said plate 47 to allow the sleeve 23 of the locking member to freely rotate therein.

Having thus described my invention I claim and desire to secure by Letters Patent.

1. In a clutch, the combination of a disk, a shaft, means for rotating said disk, a clutch member having a sleeve slidably mounted on said shaft, said clutch member adapted to be brought into frictional contact with said disk, a sleeve having projections extending through said clutch member and adapted to enter apertures formed in said disk, said sleeve having said projections being slidably mounted on the sleeve of said clutch member, a collar on the sleeve of said clutch member, said collar being detachably secured so that said sleeve carrying said projections may slide over the end of said sleeve of said clutch member and be readily removed therefrom, springs encircling said shaft to act against said sleeves and means for withdrawing said projections and said clutch member out of contact with said disk.

2. In a clutch, the combination of a disk, a shaft, means for rotating said disk, a clutch member having a sleeve slidably mounted on said shaft, said clutch member adapted to be brought into frictional contact with said disk, a sleeve having projections extending through said clutch member and adapted to enter apertures formed in said disk, said sleeve having said projections being slidably mounted on the sleeve of said clutch member, means for locking the said two sleeves together when said projections are out of action, springs encircling said shaft to act against said sleeves and means for withdrawing said projections and said clutch member out of contact with said disk.

3. In a clutch, the combination of a disk, a shaft, means for rotating said disk, a clutch member adapted to be brought into frictional contact with said disk, said clutch member having a sleeve slidably mounted on said shaft, a sleeve having projections thereon, said latter sleeve being slidably mounted on said sleeve carrying said clutch member, a key between the two last mentioned members, said clutch member having apertures formed therein through which said projections extend, said disk having apertures formed therein to receive the ends of said projections whereby said disk and said shaft may be locked together, a heavy spring to act on said clutch member, a lighter spring to act on said sleeve carrying said projections, collars on said last mentioned sleeve, means for engaging said collars to withdraw said projections, and a detachable collar on the sleeve of the clutch member adapted to be engaged by said sleeve carrying the said projections to disengage said clutch member after said projections are withdrawn.

In testimony whereof I affix my signature in presence of two witnesses.

ALONZO C. MATHER.

Witnesses:
 WALKER BANNING,
 A. H. DOUGLAS.